United States Patent [19]

Pollet et al.

[11] 4,201,585

[45] May 6, 1980

[54] PHOTOGRAPHIC BLEACH COMPOSITIONS CONTAINING BLEACH-ACCELERATING COMPOUNDS

[75] Inventors: Robert J. Pollet, Vremde; Camille A. Vandeputte, Mortsel; Francis J. Sels, Kontich; George F. van Veelen, Mortsel, all of Belgium

[73] Assignee: Agfa-Gevaert, N.V., Mortsel, Belgium

[21] Appl. No.: 952,144

[22] Filed: Oct. 17, 1978

[30] Foreign Application Priority Data

Oct. 28, 1977 [DE] Fed. Rep. of Germany ....... 2748430

[51] Int. Cl.$^2$ .......................... G03C 5/32; G03C 7/00
[52] U.S. Cl. .................................... 430/376; 430/418; 430/430
[58] Field of Search ................... 96/60 R, 60 BF, 55, 96/62

[56] References Cited

U.S. PATENT DOCUMENTS

| | | | |
|---|---|---|---|
| 3,046,129 | 7/1962 | Graham et al. | 96/107 |
| 3,046,133 | 7/1962 | Minsk | 96/107 |
| 3,241,966 | 3/1966 | Heilmann et al. | 96/60 BF |
| 3,767,401 | 10/1973 | Newman et al. | 96/60 R |
| 4,013,471 | 3/1977 | Pollet et al. | 96/107 |

FOREIGN PATENT DOCUMENTS 746567   3/1956   United Kingdom ................. 96/60 BF

*Primary Examiner*—Won H. Louie, Jr.
*Attorney, Agent, or Firm*—A. W. Breiner

[57] ABSTRACT

The processing of exposed photographic silver halide color materials is described while using a bleach or bleach-fixing bath containing better bleach-accelerating compounds. The bleach-accelerating compounds are polyoxyethylene compounds comprising at least 20 mol % of recurring oxyethylene units, which carry a thioether group in a sidechain.

10 Claims, No Drawings

PHOTOGRAPHIC BLEACH COMPOSITIONS CONTAINING BLEACH-ACCELERATING COMPOUNDS

The present invention relates to the processing of exposed photographic silver halide colour materials, more particularly to the bleaching or bleach-fixing processing steps in the presence of compounds accelerating the bleaching or bleach-fixing. It also relates to bleach or bleach-fixing compositions containing such accelerating compounds.

It is known that the processing of exposed silver halide colour materials comprises a bleaching step during which developed silver is oxidized or bleached i.e., wherein the metallic silver is brought to a higher oxidation state so that it can be removed from the material by a solvent for silver salts called fixing agent in a subsequent fixing step. The oxidation of the metallic silver image and the removal of the oxidized silver together will unexposed silver halide can also proceed in one single processing step, during which the material is bleach-fixed. Combined bleaching and fixing baths are commonly referred to as "blix" baths.

Once the material is bleached and fixed or bleach-fixed (blixed) the material comprises a dyestuff image, formed by the reaction of oxidized colour developer substances and colour couplers.

The bleach and blix solutions should fulfil various requirements in order to make them suitable for use. For example, it is advantageous that the bleach or blix solution oxidizes the silver rapidly, so that a complete bleaching especially in the high colour density areas proceeds in a short time. In a blix solution fixing also occurs more rapidly as bleaching is accelerated. Further the bleach solution should have no deleterious influence on the dyestuff images formed in the light-sensitive material. No bleach fog should form, which may occur if some colour developer is transferred to the bleach solution during processing and in oxidized form reacts with colour couplers.

It is not surprising in view of these requirements that a large variety of silver-oxidizing agents have been proposed for use in bleach and blix baths. These include water-soluble cyanoferrates(III) e.g. sodium cyanoferrate(III), potassium cyanoferrate(III) or ammonium cyanoferrate(III), water-soluble permanganates e.g. sodium permanganate, potassium permanganate, lithium permanganate, water-soluble dichromates, water-soluble persulphates, water-soluble periodates, water-soluble quinones e.g. quinone, sulphophenylquinone, chloroquinone, methoxyquinone, 2,5-dimethoxyquinone or methylquinone, p-benzoquinone, p-benzoquinone sulphonic acid, p-sulphophenylbenzoquinone, p-nitrophenylquinone sodium salt, o-aminoethylquinone, p-aminoethylquinone and quaternary salts of said amine derivatives of quinone, simple water-soluble iron(III) salt e.g. iron(III) chloride, iron(III) nitrate, iron(III) sulphate, iron(III) thiocyanate or iron(III) oxalate, a simple water-soluble copper(II) salt e.g. copper(II) chloride, copper(II) nitrate, or copper(II) sulphate, a simple water-soluble cobalt(III) salt e.g. cobalt(III) chloride or cobalt(III) ammonium nitrate, and complex salts of an alkali metal e.g. sodium and potassium or ammonium and an iron(III), copper (II) or cobalt(III) cation with an organic polycarboxylic acid (see e.g. German Patent specification No. 886,605) e.g. having one of the formulae:

$$HOOC-R^1-X-R^2-COOH$$

or $$HOOC-R^3-N-R^4-COOH$$
$$|$$
$$R^5$$
$$|$$
$$HOOC-R^3-N-R^4-COOH$$

wherein:
X represents a bivalent hydrocarbon radical, which may be substituted, oxygen, sulphur or $-N(R^6)-$ wherein $R^6$ represents hydrogen or a hydrocarbon radical, and each of $R^1$ to $R^5$ represents a bivalent hydrocarbon radical preferably containing at most 5 C-atoms which may be substituted.

Examples of suitable organic acids are ethylenediamine-tetra-acetic acid, diethylenetriamine-penta-acetic acid, o-diaminecyclohexane-tetra-acetic acid, ethylene glycol-bis(aminoethyl ether)-tetra-acetic acid, diaminopropanol-tetra-acetic acid, N-(2-hydroxyethyl)-ethylene-diamine-triacetic acid, nitrilotriacetic acid, malonic acid, ethylmalonic acid, tartaric acid, malic acid, fumaric acid, diglycolic acid, ethyliminodipropionic acid, ethylenedithioglycolic acid and dithioglycolic acid.

The above water-soluble cyanoferrates(III) and dichromates belong to the most widely used silver-oxidizing agents in bleaching baths. Other preferred bleaching agents are the above complex salts with organic polycarboxylic acids, especially ethylenediamino-tetraacetic acid, which—although they are slower in activity—are advantageously used from an ecological standpoint as they show less risk of water-pollution.

In order to form blix solutions silver halide solvents that are commonly used in fixing solutions and that include water-soluble thiosulphates, e.g. potassium thiosulphate, sodium thiosulphate or ammonium thiosulphate, and water-soluble thiocyanates, e.g. sodium thiocyanate, potassium thiocyanate or ammonium thiocyanate, are added to the bleaching solutions containing the above bleaching agents.

Other silver halide solvents that have been proposed for use as fixing agents in bleach solutions to form blix solutions are water-soluble organic diol fixing agents containing sulphur or oxygen atoms or atoms of both species interspersed along the carbon chain as disclosed in Canadian Patent specification No. 827,076, e.g. 3-thia-1,5-pentanediol, 3,6-dithia-1,8-octanediol, 3,6,9-trithia-1,11-undecanediol, 3,6,9,12-tetrathia-1,14-tetradecanediol, 9-oxo-3,6,9,12,15-pentathia-1,17-heptadecanediol or 3,6,9,12,21,30,33,36,39-nona-oxo-15,18,24,27-tetrathia-1,41-hentetracontanediol and water-soluble sulphur-containing organic dibasic acids as disclosed in UK Patent Specification No. 765,053 e.g. ethylene-bis-thioglycolic acid, 3,6,9-trithiahendecanedioic acid, 3,6,9,12-tetrathiatetradecanedioic acid and their water-soluble salts e.g. sodium salts or potassium salts.

It has been proposed in the German Patent specification No. 966,410 to use polyethylene oxides and/or derivatives thereof to improve the effectiveness of blix solutions containing a complex salt of iron(III) with an organic acid.

According to U.S. Pat. No. 3,241,966 the effectiveness of bleach-fix solutions can be further improved if a polyalkylene oxide is added to them in which some of the oxygen atoms are replaced by sulphur atoms. These bleach-accelerating substances are characterised by the following general formula:

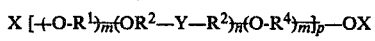

wherein each of $R^1$, $R^2$, $R^3$ and $R^4$ represents a bivalent organic radical with 2 to 10 carbon atoms which may be substituted, m represents an integer from 0 to 100, each of n and p represents an integer from 1 to 100, Y stands for a radical selected from the group consisting of —S—, —S—S—, —SO—, —SO$_2$ and

and mixtures thereof, wherein $R^5$ stands for a $C_1$-$C_3$ aliphatic radical and X represents hydrogen or an aliphatic radical, which may be substituted for improving the solubility of said compound, e.g. by hydroxyl, cyano, amino, carboxyl, sulpho, or a radical of an acid of phosphorus, X may further stand for an acyl radical derived from an aliphatic mono- or dicarboxylic acid.

However, these bleach-accelerating substances do not meet anymore the more severe demands of nowadays practice.

It is an object of the invention to find better bleach-accelerating compounds.

We now have found that the effectiveness of the bleaching and bleach-fixing of exposed and developed silver halide especially colour materials can be further improved by effecting the bleaching of bleach-fixing in the presence of a polyoxyethylene compound comprising recurring oxyethylene units wherein at least 20 mole % of the recurring units are oxyethylene units carrying side-chains with at least one thioether group, the said polyoxyethylene compound being present in the bleaching or bleach-fixing bath or in an acidic stop bath used between bleaching and the preceding development. By oxyethylene units comprising thioether groups in a side-chain is meant that the side-chain comprises sulphur atoms in the form of thioether linkages i.e., divalent sulphur atoms that are joined to two carbon atoms.

The present invention provides a method of processing an image-wise exposed light-sensitive photographic material, especially colour material, comprising the steps of treating the material with a (colour) developing solution, the treating the thus developed material with a photographic bleach containing a silver-oxidizing agent wherein the said photographic bleach and/or an acidic stop bath used between the said developing solution and the said photographic bleach comprise(s) a polyoxyethylene bleach accelerator having at least 20 mole % recurring oxyethylene units carrying side-chains with at least one thioether group.

The polyoxyethylene bleach accelerator is preferably incorporated in the photographic bleach (blix) bath. Therefore, the present invention also provides a photographic bleaching solution comprising a silver oxidizing (bleaching) agent and optionally a silver halide solvent (fixing agent), wherein the solution also comprises at least 20 mole % of recurring oxyethylene units carrying side-chain with at least one thioether group.

Preferred polyoxyethylene bleach accelerators for use according to the present invention comprise at least 20 mole % recurring units of the formula:

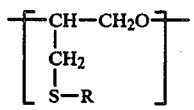

wherein R represents an aliphatic, carbocyclic aromatic or heterocyclic group, which may carry one or more substituents, e.g. alkyl, aralkyl, hydroxyalkyl, alkoxyalkyl, alkylthioalkyl, acyloxyalkyl, the alkyl groups preferably carrying at most 5 C-atoms, cycloalkyl e.g. cyclohexyl, aryl e.g. phenyl and phenyl substituted with alkyl, alkoxy, alkylthio, etc.

The compounds for use in accordance with the present invention can be derived from polyepihalohydrins, e.g. polyepichlorohydrin and polyepibromohydrin including ethers and esters thereof, by reaction with aliphatic, carbocyclic aromatic or heterocyclic mercaptides.

Although the epihalohydrin units are preferably completely converted into the units with thioether group, unreacted epihalohydrin units up to 80 mole % may occur in the polymer chain in addition to the randomly distributed recurring units with thioether group.

In this preparation of the polyoxyethylene compounds, the molecular weight of the polyepihalohydrins, ethers or esters thereof may vary within wide limits. Dimeric compounds may be used as well as commercially available polyepihalohydrins, which possess generally a molecular weight of at most 3000. However, polyepihalohydrins of higher molecular weight, as described in J. Polymer Sci. 40 (1959) 571, may also be employed.

In the following preparations representative examples are given of polyoxyethylene compounds for use according to the present invention.

Preparation 1

To a solution of 73.6 g of sodium in 1.5 of anhydrous ethanol, 250 g of 2-mercaptoethanol were added at room temperature. After addition of a solution of 320 g of polyepichlorohydrin (moleculuar weight : 1000) in 700 ml of ethanol, the mixture was refluxed for 7 h. The mixture was cooled to room temperature and the precipitate of sodium chloride was suction-filtered. The filtrate was concentrated by evaporation until dry to yield 446 g of polymeric compound comprising about 100 mol % of recurring units of the formula:

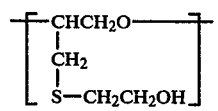

Preparation 2

To a solution of 5.75 g of sodium in 200 ml of anhydrous ethanol, 19.5 g of 2-mercaptoethanol were added at room temperature. After addition of a solution of 50 g of polyepichlorohydrin (molecular weight : 1000) in 100 ml of ethanol, the mixture was refluxed for 7 h. The mixture was cooled to room temperature and the precipitate of sodium chloride was suction-filtered. The filtrate was concentrated by evaporation until dry to yield 60 g of polymeric compound comprising about 50 mol % of randomly distributed recurring units A and about 50 mol % of randomly distributed recurring units B.

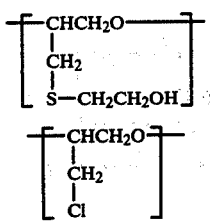

Preparation 3

Preparation 2 was repeated with the difference that the reaction partners were used in the following concentrations:
- 8.6 g of sodium in 250 ml of anhydrous ethanol
- 29 g of 2-mercaptoethanol
- 50 g of polyepichlorohydrin (molecular weight: 1000) in 100 ml of ethanol.

Yield: 65 g of polymer comprising about 75 mol % of randomly distributed recurring units A of preparation 2 and about 25 mol % of randomly distributed recurring units B of preparation 2.

Preparation 4

Preparation 1 was repeated with the difference that the following reaction partners were used:
- 24.8 g of sodium in 900 ml of anhydrous ethanol
- 84.2 g of 2-mercaptoethanol,
- 100 g of polyepichlorohydrin (molecular weight: 2000 - prepared as described in U.S. Pat. No. 2,483,749) in 600 ml of anhydrous ethanol.

Yield: 136 g of polymer having about 100 mol % of recurring units of preparation 1.

Preparation 5

To a solution of 23 g of sodium in 600 ml of anhydrous ethanol, 110 g of phenylmercaptan were added at room temperature. After the addition of a solution of 93 g of polyepichlorohydrin (molecular weight: 2000) in 200 ml of ethanol, the reaction mixture was refluxed for 16 h and 2 layers formed. By the addition of acetone, a white precipitate of sodium chloride was formed, which was suction-filtered. The filtrate was concentrated by evaporation until dry to yield 159 g of polymeric compound having about 100 mol % of recurring units corresponding to the formula:

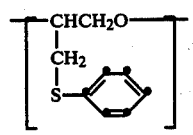

Preparation 6

To a solution of 24.8 g of sodium in 400 ml of anhydrous ethanol, 134 g of benzylmercaptan were added at room temperature. After the addition of a solution of 100 g of polyepichlorohydrin (molecular weight: 2000) in 200 ml of ethanol, the reaction mixture was refluxed for 14 h. The viscous product formed was dissolved in acetone and the white precipitate was suction-filtered. The filtrate was concentrated by evaporation until dry to yield 167 g of polymeric compound having about 100 mol % of recurring units of the formula:

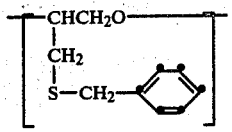

Preparation 7

To a solution of 23 g of sodium in 500 ml of anhydrous ethanol, 90 g of n-butylmercaptan were added at room temperature. After the addition of a solution of 93 g of polyepichlorohydrin (molecular weight: 2000) in 200 ml of ethanol, the reaction mixture was refluxed for 16 h. The viscous product formed solidified upon addition of acetone and ether. This white precipitate of sodium chloride was suction-filtered and the filtrate was concentrated by evaporation until dry. Yield: 130 g of polymeric compound having about 100 mol % of recurring units of the formula:

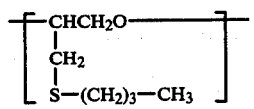

Preparation 8

To a solution of 35.5 g of the compound of preparation 1 in 200 ml of anhydrous toluene and 100 ml of anhydrous pyridine, 29.2 g of o-sulphobenzoic anhydride dissolved in toluene were added. The reaction mixture was refluxed for 12 h and a viscous product formed. The mixture was concentrated by evaporation until dry and the residue was dissolved in 1 l of water by the addition of a solution of 8.45 g of sodium carbonate in 100 ml of water. The solution was filtered and then concentrated by evaporation until dry.

Yield: 60 g of polymeric compound having randomly distributed recurring units of both of the following formulae A and C:

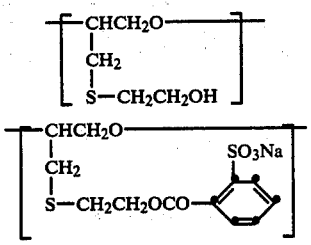

About 50% of the hydroxyl groups including the terminal hydroxyl groups of the compound of preparation 1 have been esterified by the o-sulphobenzoic anhydride.

Preparation 9

Preparation 8 was repeated with the difference that the following reaction partners were used:
- 67 g of the compound of preparation 4 in 600 ml of anhydrous toluene and 200 ml of anhydrous pyridine, and 23 g of o-sulphobenzoic anhydride dissolved in toluene.

Yield: 90 g of polymeric compound with randomly distributed recurring units of the formulae mentioned in preparation 8.

About 25% of the hydroxyl groups including the terminal hydroxyl groups of the compound of preparation 4 have been esterified by the o-sulphobenzoic anhydride.

Preparation 10

To a solution of 5.7 g of sodium in 200 ml of anhydrous ethanol, a solution of 28.5 g of 2-mercapto-1-methyl-imidazole in 250 ml of anhydrous ethanol was added at room temperature. After addition of a solution of 46.2 g of polyepichlorohydrin (molecular weight: 2000) in 400 ml of anhydrous ethanol, the reaction mixture was refluxed for 10 h. The mixture was cooled to room temperature and the sodium chloride was filtered off by suction. The filtrate was concentrated by evaporation until dry. Yield: 65.5 g of polymeric compound having about 50 mol % of randomly distributed recurring units A and about 50 mol % of randomly distributed recurring units B.

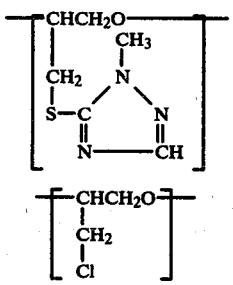

Preparation 11

To a solution of 23 g of sodium in 600 ml of anhydrous methanol, 108 g of mercaptoglycerin were added at room temperature. After addition of a solution of 92.5 g of polyepichlorohydrin (molecular weight: 2000) in 400 ml of anhydrous methanol, the reaction mixture was refluxed for 24 h and then cooled. An amount of 11 of anhydrous ethanol was added and the sodium chloride was suctionfiltered. The filtrate was concentrated by evaporation until dry to yield 165 g of polymeric compound having about 100 mol % of recurring units of the formula:

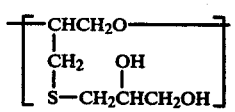

Preparation 12

To a solution of 23 g of sodium in 500 ml of anhydrous ethanol, a mixture of 39 g of mercaptoethanol and 54 g of mercaptoglycerin dissolved in 200 ml of anhydrous ethanol was added at room temperature. After addition of a solution of 92.5 g of polyepichlorohydrin (molecular weight: 2000) in 400 ml of anhydrous ethanol the reaction mixture was refluxed for 10 h and then cooled. The sodium chloride was suction-filtered and the filtrate concentrated by evaporation until dry. Yield: 153 g of polymeric compound having about 50 mol % of randomly distributed recurring units A and about 50 mol % of randomly distributed recurring units D.

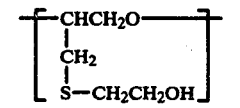

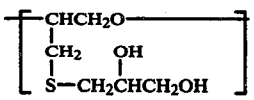

Preparation 13

Step 1

134 g of the polymer compound of preparation 1 are suspended in 800 ml of methylene chloride in a 1l-flask equipped with a stirrer, a thermometer, a dropping funnel and an air cooler. Thereupon, 125 g of thionyl chloride are added dropwise at room temperature with stirring so that hydrogen chloride escapes. The reaction mixture is stirred over night at room temperature. Then nitrogen is bubbled through for about 14 h until no hydrogen chloride evolves anymore. The reaction mixture is filtered and the methylene chloride is evaporated.

Yield: 145 g of polymeric compound corresponding to the formula:

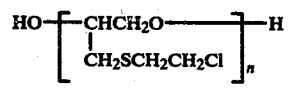

Step 2

19.5 g of mercaptoethanol are dissolved at room temperature in a solution of 5.75 g of sodium in 400 ml of ethanol. Thereupon, a solution of 38.1 g of the polymeric compound obtained in step 1 in 200 ml of acetone is added with stirring at room temperature. The mixture is stirred for 2 h whereby a precipitate forms. The suspension is then refluxed for 5 h. The pH is about 7. Then the suspension is allowed to cool to room temperature, whereupon the sodium chloride formed is suction-filtered. The mixture is evaporated to a volume of 485ml. This volume contains 48 g of polymeric compound corresponding to the formula:

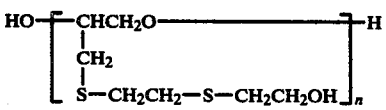

Preparation 14

A solution of 3.45 g of sodium in 200 ml of ethanol and 16.2 g of thioglycerin are placed in a 700 ml-flask equipped with a stirrer, a thermometer, a cooler and a dropping funnel. To this mixture is added dropwise a filtered solution in 1500 ml of acetone of 22.9 g of the polymeric compound obtained according to preparation 13, step 1. The precipitate formed is suction-filtered and washed with a little acetone. The solution is evaporated to a volume of 336 ml. It contains 336 g of polymeric compound according to the formula:

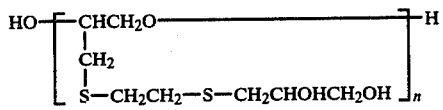

If desired, the thioether compounds used according to the present invention can be treated with various alkylating agents, e.g. the esters of an alcohol and a strong acid such as methyl or ethyl esters of sulphuric acid, phosphoric acid, hydrochloric acid, hydrobromic acid, hydroiodic acid, benzenesulphonic acid, p-toluenesulphonic acid, etc. to convert some or all of the thioether groups into sulphonium groups. By the presence of the units with ternarized sulphonium groups in the sidechain, improved solubility in water or various watermiscible solvents is obtained. In general, it suffices to merely heat the thioether compound with the alkylating agent to obtain the desired sulphonium compounds.

The bleach-accelerating compounds can be utilized in various concentrations, depending upon the effects desired, the particular silver halide emulsions employed, the thickness of the emulsion layers, the concentration of silver halides in the emulsions, the concentration of bleaching agents in the bleach or bleach-fix solutions, the pH of said solutions, etc. They can be used in any concentration that is capable of increasing the bleach or bleach-fixing action. The optimum amount for any given compound can be determined for any particular solution by running a series of tests in which the quantity is varied over a certain range.

In general, useful results are obtained when the concentration of the thioether compound in the bleach, bleach-fix or stop bath is between about 100 mg and about 20 g per liter. They are preferably used in concentrations from 0.5 to 5 g per liter.

The bleach solutions used in the present invention comprise a silver-oxidizing agent for which there is referred to those mentioned hereinbefore. The thioether compounds defined above for use according to the present invention have been found particularly suitable for accelerating bleaching by means of the water-soluble cyanoferrate(III) and the complex salts of an alkali metal or ammonium and iron(III) with an organic polycarboxylic acid referred to hereinbefore, especially ethylenediaminetetra-acetic acid.

The bleach solution used according to the present invention may comprise one or more silver halide solvents as fixing agents so that a blix solution is obtained. Preferred fixing agents are the thiosulphates and thiocyanates referred to hereinbefore but the diol fixing agents and thiocarboxylic acids referred to can also be used.

The silver-oxidizing agents and the fixing agents are used in amounts conventional in the art i.e. between about 5 g and about 200 g, preferably between 10 g and 100 g, per liter for the oxidizing agent and between about 20 g and 400 g, preferably between 50 g and 30 g, per liter for the silver halide solvent. Any of the common addenda may be added to the bleach or blix solutions besides the silver oxidizing agent and optionally the silver halide solvent, e.g. alkali metal bromides, ammonium bromide, alkali metal iodides and ammonium iodide. The bleach and blix baths may also comprise as stabilizing agent water-soluble sulphites, hydrogen sulphites, metabisulphites, organic sulphinic acids and their alkali and alkaline earth metal salts and stabilizing agents of the type described in the published German Patent Application (DT-OS) No. 2,439,153 which are carbonyl sulphite addition products of (di)aldehyde hardening agents, e.g. glutaraldehyde-bis-sodium hydrogen sulphite. To baths intended for processing at elevated temperatures or to baths that are very agressive, hardening substances commonly employed in the art to harden hydrophilic colloid layers, e.g. formaldehyde and organic aldehydes, can be added as described in Belgian Patent specification No. 778,273. Any other addenda commonly used in blix and bleach baths can be used, e.g. water softeners e.g. aminocarboxylic acids of the type used to form a complex with iron(III) and thus to form a bleaching agent, thickening agents, etc.

The pH of the baths of the invention are usually from neutral to slightly acid but may also be slightly alkaline. The pH is generally comprised between pH 4 and 8. The bleach or bleach-fixing solutions can further comprise other compounds known as accelerations for bleaching e.g. aminoalkylenethiols as described in French Patent specification No. 2,223,727, mercaptotriazoles and mercaptothiadiazoles referred to in published German Patent Application (DT-OS) No. 2,439,153.

Bleach and bleach-fixing baths according to the present invention can be used for the development of photographic recording materials intended for the colour reversal process or that are colour negative materials or colour copying materials. Further, the baths may be used in photographic developing processes according to which exposed photographic recording materials are developed with colour-developing baths that contain colour couplers or wherein photographic recording materials are used that contain colour couplers in the silver halide emulsion layers or in layers adjacent thereto.

The light-sensitive layers of the recording materials, which can be treated with bleach-fixing baths according to the present invention may be the common known photographic recording materials and thus contain the common known silver halides, e.g. silver chloride, silver bromide, silver bromide iodide, silver chloride bromide, silver chloride iodide and silver chloride bromide iodide or mixtures thereof. The separate light-sensitive layers may contain the common known addenda. Moreover, the recording materials, which can be treated with the bleach-fixing baths according to the invention, may contain the usual known supports, e.g. sheets of cellulose nitrate, cellulose acetate, polyvinylacetals, polycarbonates, polystyrene and polyethylene terephthalate. However, the supports may be made of paper or paper laminated with a polymer layer.

In the processing of exposed photographic silver halide colour materials wherein bleach or blix baths according to the present invention are used the colour development occurs by means of aromatic primary amino developing substances, which are capable of forming azomethine dyes by coupling in their oxidized form with the colour couplers. Suitable developing agents are more particularly p-phenylenediamine and derivatives thereof, e.g. N,N-dialkyl-p-phenylenediamines, N,N-dialkyl-N'-sulphomethyl-p-phenylenediamine, N,N-dialkyl-N'-carboxymethyl-p-phenylenediamine, the sulphonamido-substituted p-phenylenediamines disclosed in U.S. Pat. No. 2,548,574 and other substituted p-phenylenediamines disclosed in U.S. Pat. No. 2,566,271.

Typical examples of p-phenylenediamines are N,N-diethyl-p-phenylenediamine, 2-amino-5-diethylaminotoluene, N-butyl-N-sulphobutyl-p-phenylenediamine, 2-amino-5-[N-ethyl-N-($\beta$-methylsulphonamido)-ethyl]-aminotoluene, N-ethyl-N-$\beta$-hydroxyethyl-p-phenylenediamine, etc. These developing agents are used usually in their salt form such as the hydrochloride or sulphate.

EXAMPLE 1

A conventional blue-sensitive silver bromide iodide emulsion comprising a yellow-forming colour coupler corresponding to the following formula:

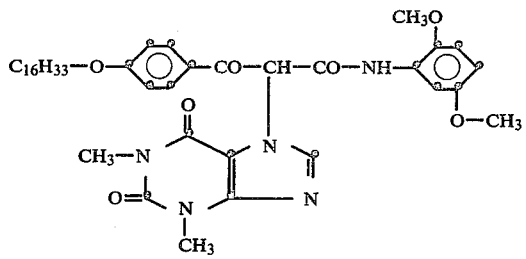

was coated on a conventional film support and dried. After having been dried, strips of the obtained light-sensitive material were exposed through a step-wedge and then reversal-processed. Processing occurred at 38° C. and comprised the following steps: development for 3½ min in a conventional black-and-white developer, treatment in a stop bath for 1½ min, rinsing for 3 min, overall reexposing, colour development for 10 min in a conventional 2-amino-5-[N-methyl-N-($\beta$-methylsulphonylamino)-ethyl]-aminotoluene sulphate developing composition, treatment in an acetic acid stop bath for 1½ min, bleaching for 3 min in a bath of the composition given hereinafter, rinsing for 1½ min and fixing for 1½ min in a conventional thiosulphate fixing solution. Bleaching of a first strip occurred in a bleach solution comprising following ingredients:

| water | 800 ml |
| --- | --- |
| sodium bromide | 35 g |
| sodium hexacyanoferrate(II)-10-water | 240 g |
| potassium persulphate | 67 g |
| borax | 2 g |
| water to make | 1 l |
| | (pH = 7.8) |

Other strips were bleached in a bleach bath equivalent to that mentioned hereinbefore, with the only difference that 3 g of a bleach accelerator were added per liter of bleach bath.

The results obtained are listed in the following table.

| bleach accelerator | residual silver in g/sq.m at yellow density D = 1.5 |
| --- | --- |
| none | 0.18 |
| polyethylene glycol of molecular weight 1500 | 0.08 |
| compound of preparation 1 | 0.00 |

Even after 14 days the bleach bath containing the compound according to the present invention leaves no residual silver at the above densities.

EXAMPLE 2

Strips of a silver halide material as described in Example 1 but comprising the colour of the formula:

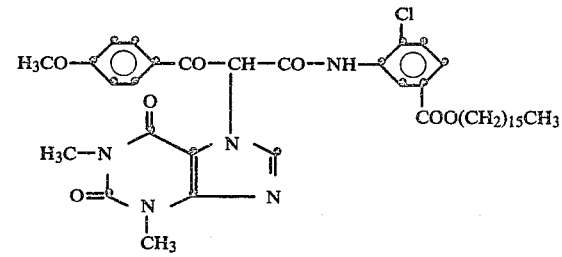

were processed as described in Example 1. Different bleach accelerators were added to the bleach bath as is apparent from the following table.

| bleach added accelerator | residual silver in g/sq.m measured at $D_{max}$ colour |
| --- | --- |
| none | 0.15 |
| compound of prep. 1 (3 g) | 0.03 |
| compound of prep. 11 (3 g) | 0.07 |
| compound of prep. 8 (3 g) | 0.05 |

EXAMPLE 3

Strips of a conventional colour negative material comprising in order a film support, a blue-sensitive emulsion layer containing a yellow-forming coupler, a red-sensitized silver halide emulsion layer containing a cyan-forming coupler and a green-sensitized emulsion layer containing a magenta-forming coupler were exposed through a step-wedge and a commercially available blue filter.

As is known from practice the silver of the blue-sensitive layer is bleached the slowest. By using a bleach accelerator the bleaching time was shortened as appears from the results below.

The strips were processed according to the following sequence: 20 s prebath, 20 s rinsing, 8 min colour development in a bath containing 2-amino-5-diethylaminotoluene hydrochloride as colour developing agent, 20 s treating in a stop bath, 20 s rinsing and bleach-fixing for the time mentioned in the table hereinafter in a blix bath of the composition:

| monosodium iron(III) salt of ethylenediamine-tetra-acetic acid | 37.5 g |
| --- | --- |
| trisodium salt of ethylenediamine-tetra-acetic acid | 12.5 g |
| anhydrous sodium thiosulphate | 100 g |
| anhydrous sodium sulphite | 10 g |
| thiourea | 5 g |
| water to make | 1 l |
| | (pH 6.85) |

Other strips were processed according to the same sequence with the difference that 1 g of the compound of preparation 11 was added to the blix bath per liter.

After processing the maximum yellow density was measured and the diminution thereof when using the blix bath with bleach accelerator is a measure for the bleach-accelerating effect.

The results obtained are listed in the following table.

| Densities | bleach-fixing time in min | | | | |
|---|---|---|---|---|---|
| | 1 | 1¼ | 2 | 2¼ | 3 |
| without bleach accelerator | 2.65 | 2.57 | 2.50 | 2.46 | 2.45 |
| with bleach accelerator | 2.43 | 2.34 | 2.26 | 2.25 | 2.25 |

EXAMPLE 4

Example 1 was repeated with the difference that the diminution of the magenta- and cyan densities at yellow density D=1.20 was taken as a measure of, or the decrease of, residual silver by the bleach accelerator.

| bleach accelerator | densities | | |
|---|---|---|---|
| | yellow | magenta | cyan |
| none | 1.20 | 0.31 | 0.26 |
| 3 g of compound of preparation 1 | 1.20 | 0.08 | 0.04 |

EXAMPLE 5

To illustrate the use of the bleach accelerators in a stop bath preceding the bleaching, example 1 was repeated and a stop bath was used comprising per liter 25 g of ethylenediamine-tetra-acetic acid and 25 g of sodium disulphite (Na₂S₂O₅) and optionally 3 g of the bleach accelerator of preparation 1. The magenta- and cyan densities at yellow density 1.20 are listed in the following table.

| bleach accelerator in stop bath | densities | | |
|---|---|---|---|
| | yellow | magenta | cyan |
| none | 1.20 | 0.28 | 0.21 |
| compound of preparation 1 | 1.20 | 0.18 | 0.12 |

EXAMPLE 6

A usual photographic colour reversal material was prepared by coating on a support the following layers:
(a) a red-sensitive silver halide emulsion containing a cyan-forming coupler of the formula:

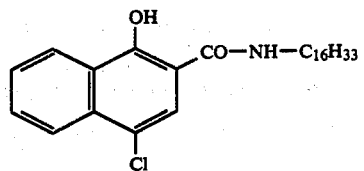

(b) a green-sensitive silver halide emulsion containing a magenta-forming coupler of the formula:

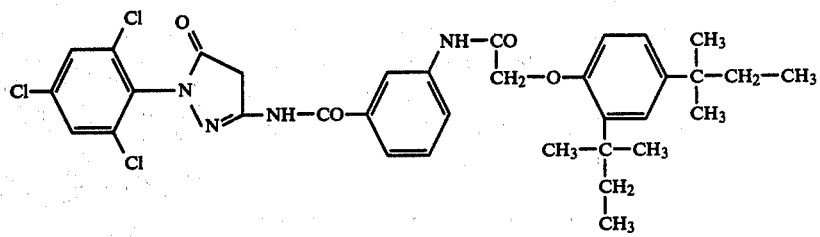

(c) a blue-sensitive silver halide emulsion containing a yellow-forming coupler of the formula:

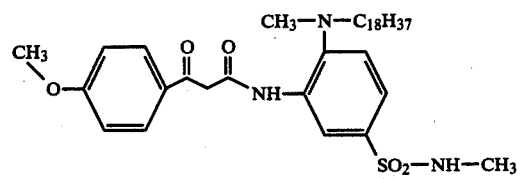

The material was hardened with a hardening agent having the formula:

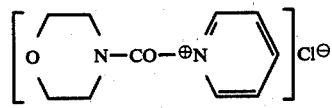

Then the material was exposed through a step-wedge and treated in the following reversal processing steps in the usual baths at the given temperatures. The processing comprises the following steps:

| Processing step A | Time (s) | Temperature (°C.) |
|---|---|---|
| first development | 120 | 40 |
| stop bath 1 | 20 | 50 |
| rinsing | 40 | 50 |
| second development colour development | 180 | 50 |
| stop bath 2 | 60 | 50 |
| rinsing | 60 | 50 |
| bleaching | 60 | 50 |
| rinsing | 40 | 50 |
| fixing | 40 | 50 |
| rinsing | 120 | 50 |

After the second development the material was bleached in a bleach bath containing per liter the following products as well as, optionally, 2 g of one of the bleach accelerators to be used according to the invention:

| Bleach bath | |
| --- | --- |
| potassium hexacyanoferrate(III) | 80 g |
| potassium bromide | 25 g |
| sodium acetate | 30 g |
| sodium hexametaphosphate | 2 g |
| glacial acetic acid | 5 ml |
| | (pH = 5.4) |

After finished processing the residual silver was determined by infrared-absorption measurements in a range wherein practically only the residual silver but no other components of the photographic material absorb. On the basis of the absorption measurements the following amounts of residual silver (indicated each time in mg of equivalent silver nitrate per sq.m):

| Added bleach accelerator | Residual silver (expressed in mg $AgNo_3$/sq.m) at | |
| --- | --- | --- |
| | $D_{min}$ | $D_{max}$ |
| none (comparison) | 2.92 | 34.99 |
| comparison + 10 ml of benzyl alcohol | 1.11 | 8.02 |
| comparison + 2 g of 5-amino-1,3,4-thiadiazole-2-thiol | 2.19 | 8.75 |
| compound of prep. 1 | 0 | 0 |
| compound of prep. 8 | 0 | 0 |
| compound of prep. 11 | 0 | 0 |

The benzyl alcohol considered as a comparison compound is a known bleach accelerator. The 5-amino-1,3,4-thiadiazole-2-thiol used as another comparision compound is also a recognized good bleach accelerator and is known as such e.g. from the published German Patent specification (DT-AS) No. 2,439,153.

We claim:

1. A method of processing an image-wise exposed light-sensitive photographic material with at least one silver halide emulsion layer comprising the steps of treating the material with a developing solution, and treating the thus developed material with a photographic bleach containing a silver-oxidizing agent wherein the said photographic bleach and/or an acidic stop bath used between the said developing solution and the said bleach comprise(s) a polyoxyethylene compound, which comprises at least 20 mol % recurring oxyethylene units carrying side-chains with at least one thioether group corresponding to the formula:

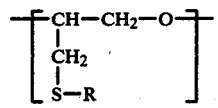

wherein R represents a member of the group consisting of an aliphatic, aromatic and a heterocyclic group, which may carry one or more subsituents.

2. A method according to claim 1, wherein R is an alkyl group or an hydroxylalkyl group.

3. Method according to claim 1, wherein the polyoxyethylene compound comprising recurring oxyethylene units carrying side-chains with at least one thioether group is obtained by reaction of a polyepihalohydrin or an ether or ester thereof with an aliphatic, carbocyclic-aromatic or heterocyclic mercaptide.

4. Method according to claim 3, wherein the polyoxyethylene compound comprising recurring oxyethylene units carrying side-chains with at least one thioether group is obtained by complete conversion of the polyepihalohydrin so that all recurring units comprise thioether substituents in a side-chain.

5. Method according to claim 1, wherein the said polyoxyethylene compound is present in the bleach bath in an amount between about 100 mg and about 20 g per liter.

6. Method according to claim 1, wherein the bleach bath also comprises a silver halide solvent selected from the group consisting of a thiosulphate fixing agent for silver halide and a thiocyanate fixing agent for silver halide.

7. Method according to claim 1, wherein the photographic element is a colour element incorporating colour couplers capable of coupling with the oxidation products of an aromatic primary amino colour developing agent to form dyestuff images.

8. Photographic bleach solution incorporating a silver-oxidizing agent and a polyoxyethylene compound containing at least 20 mol % of recurring oxyethylene units comprising at least one thioether substituent in a side-chain corresponding to the formula:

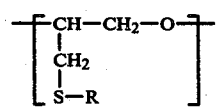

wherein R represents a member of the group consisting of an aliphatic, aromatic and a heterocyclic group, which may carry one or more substituents.

9. A photographic bleach solution according to claim 8, wherein said compound is present in an amount between about 0.1 g and about 20 g per liter.

10. A photographic bleach solution according to claim 7, wherein the solution also comprises a silver halide solvent selected from a thiosulphate and a thiocyanate fixing agent for silver halide.

* * * * *